United States Patent
White et al.

(10) Patent No.: US 6,230,184 B1
(45) Date of Patent: May 8, 2001

(54) METHOD AND APPARATUS FOR AUTOMATICALLY OPTIMIZING EXECUTION OF A COMPUTER PROGRAM

(75) Inventors: Greg White, Mountain View; Su Chan, Sunnyvale; Achut Reddy, Mountain View, all of CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/175,211

(22) Filed: Oct. 19, 1998

(51) Int. Cl.⁷ .................................................. G06F 13/00
(52) U.S. Cl. ............................................................. 709/201
(58) Field of Search .................................. 709/100, 200, 709/201, 202, 203, 222, 328, 330, 331; 713/1, 2

(56) References Cited

U.S. PATENT DOCUMENTS 5,778,234 * 7/1998 Hecht et al. ............................. 713/1
5,857,101   1/1999 Ballard et al. .

OTHER PUBLICATIONS

XP 002142004 Anonymous: Oracle Developer/2000: Deploying Applications on the Web, Aug. 20, 1997, retrieved from the Internet: http://cslab00:monmouth.edu/webdoc/chap 2.htm on 7/6/006.

XP 002142005 Verners, Bill, Understanding Digital Signatures: Inside the Java Virtual Machine, Aug. 25, 1997, retrieved from the Internet: http://www.sxrb.com/gl/books/javavm/chap04.htm, retrieved on Jun. 6, 2000.

XP 002142006 Arseniev, Marina, Morse, Tim, Comparison: Jar vs. non–Jar, Oct. 29, 1997, retrieved from the Internet, http://atlas.adcom.uci.edu/distributedObject–dev/documentation/jar–comparison.html on Jul. 5, 2000.

* cited by examiner

Primary Examiner—Robert B. Harrell
(74) Attorney, Agent, or Firm—The Hecker Law Group

(57) ABSTRACT

The claimed invention can be used to automatically determine what files are needed to optimally execute a computer program to a desired state. In one embodiment the invention automatically creates an optimized file containing the files that are necessary to reach the desired state of a computer program. One or more remainder files may also be created. A remainder file contains the files that may be used by the computer program after reaching the desired state of execution.

24 Claims, 11 Drawing Sheets

METHOD AND APPARATUS FOR AUTOMATICALLY OPTIMIZING EXECUTION OF A COMPUTER PROGRAM

BACKGROUND OF THE INVENTION

1. Field of the Invention

This invention relates to the field of computer software and more specifically to a method and apparatus for automatically optimizing execution of a computer program.

Portions of the disclosure of this patent document may contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever. Sun, Sun Microsystems, the Sun logo, Java and all Java-based trademarks and logos are trademarks or registered trademarks of Sun Microsystems, Inc. in the U.S. and other countries.

2. Background Art

The use of networks for the distribution of computer programs has grown dramatically, particularly in the case of the Internet and the World Wide Web. A problem with distributing large computer programs over a network is that a large amount of time is required to download and initialize the program. This problem can be understood by reviewing the current methods for distributing computer program and documents over computer networks.

Internet

Computer programs and documents can both be distributed over the Internet. The Internet is a worldwide network of interconnected computers. A client, or Internet client, typically refers to the computer that a person uses to access the Internet. An Internet client accesses other computers on the Internet via an Internet provider. An Internet provider is an organization that provides a client with access to the Internet (via an analog telephone line or Integrated Services Digital Network (ISDN) line, for example).

Distributing Documents Over a Network

A client can, for example, download a document from or send an electronic mail message to another computer/client using the Internet. One type of file a client can download is known as a web page. A web page contains text, pictures, or other types of files that are displayed on the client using a web browser. A web browser is a software program that executes on the client and uses the Hypertext Transfer Protocol (HTTP) to request web pages from servers throughout the Internet. HTTP is a set of rules for exchanging files (text files, image files, sound files, video files, and other data files). Netscape Navigator and Internet Explorer are both examples of widely used web browsers that use the HTTP protocol. (Note that HTTP is only one protocol available to exchange files. Any of several other protocols may also be used.)

Displaying Documents (or files) Using a Web Browser

The Hypertext Markup Language (HTML) is used to describe how to display a web page. An HTML description is typically comprised of a set of "markup" symbols. An HTML document or file that contains the "markup" symbols for a web page is transmitted to the client computer. The web browser executing at the client parses the "markup" symbols in the HTML document and produces and displays a web page based on the information in the HTML document. Consequently, the HTML document defines the web page that is rendered at runtime on the browser. For example, the following set of "markup" symbols directs the browser to place a title, a heading, and an image called "image.jpg" on a web page:

```
<HTML>
<HEAD>
<TITLE>This is the documents title</TITLE>
</HEAD>
<BODY>
<H1>This text displayed using heading level one</H1>
<IMG SRC="http:/ /(active domain name address)/image.jpg">
</BODY>
</HTML>
``` where (active domain name address) comprises a URL (or Uniform Resource Locator) or an IP (or Internet Protocol) address. The "markup" symbols typically surround an HTML command. The "<" symbol indicates the start of an HTML command and the "</" symbol indicates the end of an HTML command. Each start or end command has a corresponding ">" to indicate the close of that particular command. The information the HTML command is issued on is typically contained between the ">" symbol of the start command and the "</" symbol of the end command. An HTML command describes to the web browser what to do with the block of information located between the two commands. In the above example, "<HTML>", "</HTML>", "<TITLE>" and "</TITLE>" are examples of HTML commands surrounded by "markup" symbols.

When a web browser receives an HTML document it displays the information contained between each set of "markup" symbols in a manner that coincides with the HTML commands issued. For example, the text "<TITLE>This is the document title</TITLE>" directs the web browser to place the text "This is the document title" in the title bar of the web browser.

Some HTML commands have attributes. The HTML command "<IMG>", for example, has a "SRC=" attribute. The <IMG> command tells the web browser to display an image and the "SRC=" attribute identifies the location and name of the image to be displayed. For example, the statement <IMG SRC="http://(active domain name address)/image.jpg"> tells the web browser to display an image named image.jpg that can be obtained from the web server located at the address http://(active domain name address).

Distributing Computer Programs Over a Network

In addition to retrieving documents containing "markup" symbols a client can also use the Internet to obtain other files such as a computer program from another computer located on the same network. Various mechanisms exist for retrieving computer programs using the Internet or other types of computer networks. To understand the problems and disadvantages associated with current approaches to distributing computer programs over a network, a review of programming environments is helpful.

The Programming Environment Utilized by the Java Programming Language

Java is an object-oriented programming language and thus programs written in the Java programming language are comprised of a number of different classes and interfaces. Unlike many programming languages, in which a program is compiled into machine-dependent, executable program code, programs written in the Java programming language are compiled into machine-independent bytecode classfiles. Each classfile contains code and data in a platform-independent format called the classfile format. The computer system acting as the execution vehicle contains a program called a virtual machine, which is responsible for executing the bytecode. The virtual machine provides a level of abstraction between the machine-independent bytecode classes and the machine-dependent instruction set of the underlying computer hardware. Virtual machines exist for a variety of different operating systems. A "class loader" within the virtual machine is responsible for loading the bytecode classfiles as needed, and either an interpreter executes the bytecodes directly, or a "just-in-time" (JIT) compiler transforms the bytecodes into machine code, so that they can be executed by the processor.

FIG. 1A provides an example of the programming environment utilized by the Java programming language. When this programming environment is installed on a client computer 111–113, (FIG. 1B) that computer can run programs. Programs are run in a Java Runtime Environment 103 (JRE). The JRE 103 is comprised of a class loader 104, a bytecode verifier 105, and one or more classes 106. The JRE utilizes a Java Virtual Machine (JVM) 107 comprised of a bytecode interpreter 108 and a peer interface 109. The JVM 107 interprets the bytecode using a bytecode interpreter 108. (Note that in some architectures (e.g. JavaStation), the bytecodes can be executed directly, requiring neither interpreter nor JIT.)

The programming environment utilized by the Java programming language can optionally include additional components. For example, a Just In Time (JIT) compiler 110 can also be added to the programming environment if desired. The JIT is a compiler that converts bytecode into machine code as a program executes.

Referring now to FIG. 1B, each computer contains its own JVM 107. The JVM 107 interfaces with different types of native operating systems 114–116. Each computer 111–113 may contain a different operating system 114–116. Using JVM 107 computers 111–113 are able to execute bytecode in a manner that coincides with the operating system 114–116 each computer contains. For example, computer 111 and computer 112 can both execute the same program even if each computer contains a different operating system. Computer 111 can execute a program using the UNIX operating system 114 and computer 112 can execute a program using the Java operating system 115.

Description of an Applet

Sending an applet across a computer network is one way to distribute a computer program. An applet is a computer program that may appear embedded in a web page or may be separate from a web page. Applets are sent to a client when a web page containing the applet is requested by the client. For example, if a person views a web page that contains the following code an applet called "animator" is sent to the browser for display:

```
<HTML>
<APPLET CODE="animator.class" WIDTH=640 HEIGHT=480>
</HTML>.
```

An applet written in the Java programming language that runs with the aid of a web browser or another program, such as AppletViewer, is called a Java applet. A program written in Java that executes without the aid of a web browser is called a Java application. A Java applet is a program written in the Java programming language that is distributed as part of a web page. In the example above, a classfile named "animator.class" is downloaded to the client and executed with the aid of a web browser.

Although applets are described as being transferred via HTTP to web browsers, the present application is not limited to such transfers. The invention contemplates transfers using any suitable protocol, with or without the use of a web browser. The transfer may be via FTP, via modem communication, via network distribution, client/server distribution, via carrier wave, via transfer on portable media, or any other method of transfer of data.

Further, the present application is not limited to Java programming language based applets and applications, but has equal application to any file or programming language application, or where non-application code of any sort is being distributed.

Uncompressed Java Programs

When a program is created using the Java programming language it is typically comprised of a number of individual files. Sending a copy of these files from one computer to the next through a computer network is one way to distribute a program. For example, referring now to FIG. 2, a single Java applet 200 may require a number of different classfiles 201–210, image files 211–215, sound files 216–220, and other types of data files 221–223 during its execution. Java applet 200 resides on a server 259 and is sent across network 250 when a request 253 is made by the browser 252 on client computer 251. Client computer 251 initiates a request 253 by issuing an HTTP request to the server computer 259 upon which the Java applet 200 resides. In response to request 253 each file that comprises the Java applet 200 is sent across the network 250.

These files may be sent across the network 250 in separate HTTP request/response pairs. Classfile 201, for example, is sent across network 250 in a separate request/response pair from classfile 203. In FIG. 2, every file is sent using a separate HTTP request/response pair. The lines connecting files 201–223 with network 250 represent a series of HTTP request/response pairs 260–282. Network 250 utilizes each HTTP request/response pair 260–282 to contact client computer 251 and send files 201–223 to client computer 251. The Java applet will begin executing when the first classfile is received. As additional files are required, execution will be suspended until the additional files can be retrieved, and then execution will resume. Files 201–223 are not compressed before they are sent across the network. A problem with distributing computer programs in this manner is that long time delays exist between the time when the initial request for the Java applet is made and the time of the response. (Here, a request is a message from the client to the server asking for something, such as a classfile or jar file. A response is the server's message back to the client to fulfill a request). As a result program startup is delayed. This results in a perceptible delay for the user who wishes to display a web page that contains an applet.

Packaging and Compression/Decompression Techniques

One way of reducing the time it takes to send a program across a network is to package several files into one file, or to compress each file or the packaged files before sending across the network. There are several different schemes for packaging and/or compressing files.

ZIP Files

A ZIP file is used to package and distribute files. ZIP files contain one or more individual files. To create a new ZIP file the user manually decides what files to place inside the ZIP file. Once the user selects one or more files, the ZIP file is created when a create command is issued. The files that comprise a Java program (e.g. a Java applet), for example, can be grouped together and placed into a ZIP file for distribution.

Placing a group of files together into a ZIP file provides a way to transport that group across the network faster than if the files were sent individually. That is, a single request/response pair is used to send the packaged data. When a client computer, for example, requests a ZIP file the entire file is transported across the network in a single HTTP request/response pair. A disadvantage of ZIP files is that the user must manually select what files to place inside the ZIP file. Classfiles can be loaded directly from a zip file. It should be noted that the packaged files can be compressed or the files comprising the package can be individually compressed if desired.

Java Archive (JAR) Files

A Java Archive (JAR) file is a file that contains one or more other files. A JAR file, for example, enables the user to place a collection of compressed files into a single archive file. A JAR file typically contains the classfiles and other data files associated with an applet or application. One way to create a JAR file is to use a JAR packager. The JAR packager is a Java application that combines multiple files into a single JAR file. The JAR packager can be used, for example, to create a single file containing all the compressed files needed to execute a Java applet or Java Application. The basic format for creating a JAR file using the JAR packager is as follows:

jar cf jar-file input-file(s).

This command generates a compressed JAR file. The jar command also generates a default manifest file called MANIFEST.MF and places it in a directory called META-INF. The manifest file is a file that contains information about the files packaged in the JAR file. The c option indicates that the user wants to create a JAR file. The f option indicates that the output is sent to a file rather than to an output stream. The c and the f option can appear in any order, but should not be separated by a space. The jar-file argument is the name of the JAR file the user wants to create. The input-file(s) argument is a space-delimited list of one or more files the user wants to place in the JAR file. The input-file(s) argument can contain a wildcard (*) symbol. If any of the input-file(s) are directories, the contents of these directories are added to the JAR file recursively.

Alternative ways to manually create a JAR file also exist. Any file that organizes information using the JAR format is considered a JAR file. The JAR format is a set of conventions for associating digital signatures, and other information with the files held in the JAR file. Thus, one way to make a JAR file is to create a file that utilizes these conventions. The following steps, for example, enable the user to create a JAR file: 1) manually identify the files to be placed in the JAR file 2) create a manifest file 3) if the files in the JAR archive are going to be digitally signed, the appropriate digital signature files are placed in a subdirectory called META-INF 4) combine the META-INF files with the other files and create a single ZIP file.

Once the components of an applet or application (classfiles, image files, sound files, data files, etc.) are combined into a single JAR file it is possible to distribute a group of files using a single HTTP request/response pair rather than requiring a new request/response pair for each file. Combining more than one file into a single file and then compressing those files improves download times. A disadvantage with JAR files is that the user must specify what files to place in the archive prior to creating the JAR file. An additional disadvantage is that the entire JAR file must be downloaded before a program can begin to execute.

FIG. 3 shows an example of a computer program comprised of multiple files. Java applet 200, for example, is comprised of numerous classfiles 201–210, image files 211–215, sound files 216–220, and data files 221–223. Using the JAR packager, for example, an archive file 300 can be built that contains Java applet 200. Archive file 300 can also be created using other suitable file formats such as the ZIP file format. When browser 252 encounters a web page containing HTML "markup" symbols enclosing an <APPLET> command, an HTTP request 301 is made for Java applet 200 contained in Archive file 300. For example, if Java applet 200 is contained in an archive file 300 named jarFile.jar the following HTML code results in a request for the file named jarFile.jar. When a request is made the file jarFile.jar applet 200 is transferred from server 259 to client 251. The archive attribute can list one or more jar files, all of which will be downloaded before the applet begins execution.

```
<APPLET CODE=Applet.class ARCHIVE="jarFile.jar"
    WIDTH=anInt HEIGHT=anInt>
<PARAM NAME=parameter1Name VALUE=aValue>
<PARAM NAME=parameter2Name VALUE=anotherValue>
</APPLET>
```

In response Server 259 delivers the file jarFile.jar to browser 252 using a single HTTP response 302. This provides a way to transfer all of the files that comprises Java applet 200 from server 259 to the browser 252 that resides on client 251. A disadvantage with this approach is that browser 252 cannot begin executing Java applet 200 until the entire archive file 300 is received. Another disadvantage with JAR files is that the user must manually determine what files to place in the JAR file.

As the above example indicates a problem with distributing large computer programs over a network is that a large amount of time is required to download and initialize the program. In many cases this amount of time is unacceptable to the user. In an effort to reduce the amount of time a user must wait before a program loads archive files may be utilized. Many of the prior art solutions do not provide a way to minimize the amount of time required for a program to reach a desired state. The ZIP format improves on this by attempting to place them into a single archive file. However, to place files in a ZIP archive the user must manually determine what files need to be placed in the archive file. To utilize the JAR format the user must also manually determine what files to place in the archive. To create an archive file that is capable of bringing a computer program to a certain point of execution the user must manually determine what files accomplish that and then manually create an archive file consisting of those files. This process is cumbersome and does not provide a way to automatically optimize the execution of a computer program. Alternatively, the prior art contemplates manually determining only those files needed for startup and placing those files into a packaged file.

SUMMARY OF THE INVENTION

With advancements in network technology, the use of networks for facilitating the distribution of computer programs has grown dramatically, particularly in the case of the Internet and the World Wide Web. These computer programs have increasingly grown in size. A problem with distributing such computer programs over a network is that a large amount of time is required to download and initialize the program.

Embodiments of the invention comprise a method and apparatus for automatically optimizing loading of a computer program. The files needed to execute the computer program until it reaches a desired state are identified and placed in an optimized file. The optimized file can be executed on the computer on which it resides or it can be transmitted from one computer to another (e.g. from a server to a client computer). The optimized file enables a computer to execute a computer program until a previously determined desired state is attained. Other files may be provided which enables the computer with the ability to execute the computer program beyond the desired state. The desired state of the computer program may be, for example, the point where user input can be accepted by the computer program.

In one embodiment of the invention, the optimized file is a collection of data files packaged together into a single file. A Java Archive (JAR) file, for example, is one kind of optimized file. The present invention can also utilize other types of file packaging formats such as the ZIP file format. Any kind of file comprised of one or more other files is suitable for creating an optimized file. The type of computer programs addressed by the present invention are comprised of more than one file. A computer program implemented as a Java applet, for example, is comprised of classfiles, image files, sound files, data files, etc. Of all the files that make up the computer program only a percentage of these files is required to actually start the program. In an embodiment of the invention, the files needed to start the program are automatically determined and placed into an optimized file.

DETAILED DESCRIPTION OF THE INVENTION

Figure 1A:
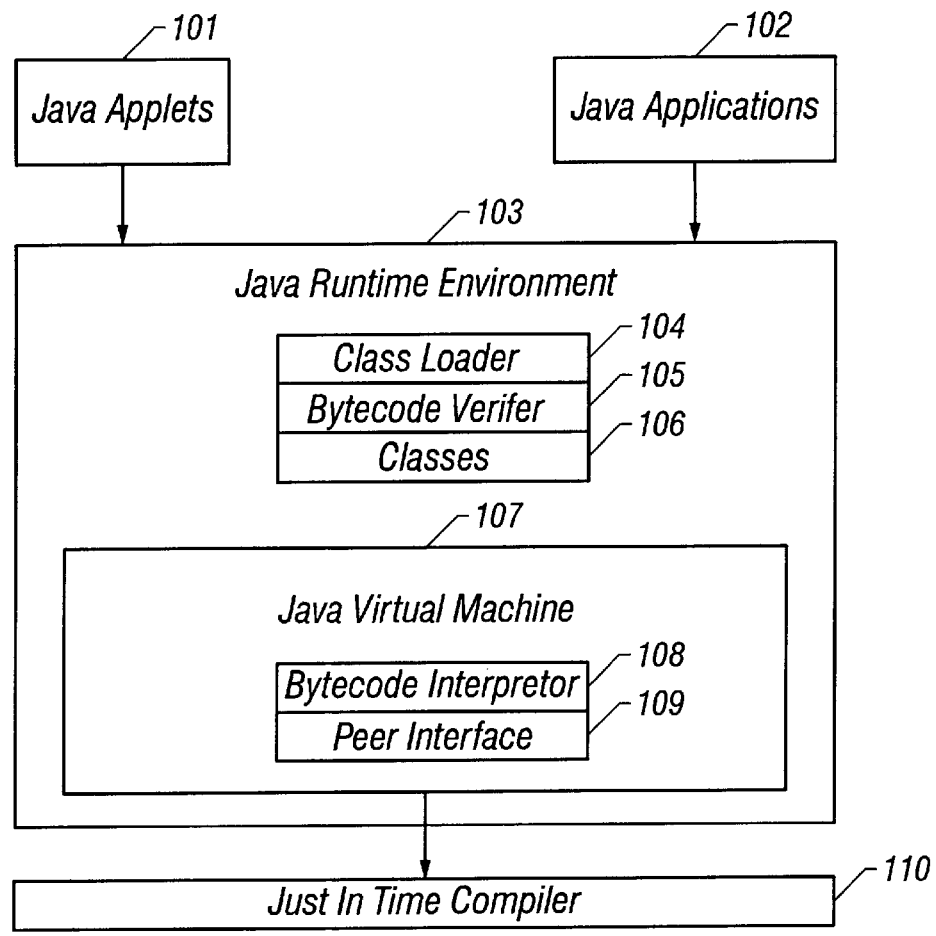
FIG. 1A illustrates an example of the programming environment utilized by the Java programming language.
Figure 1B:
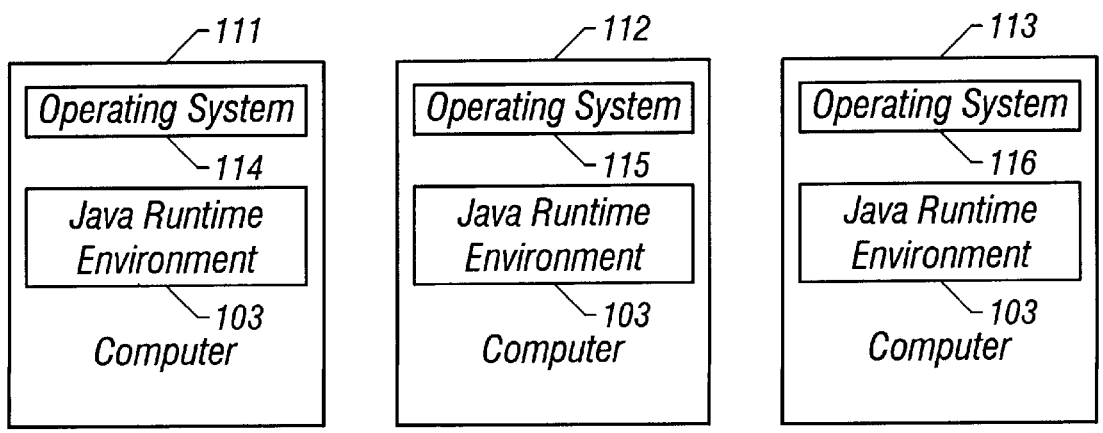
FIG. 1B illustrates that each computer contains a virtual machine for interfacing with the native operating system of the computer.
Figure 2A:
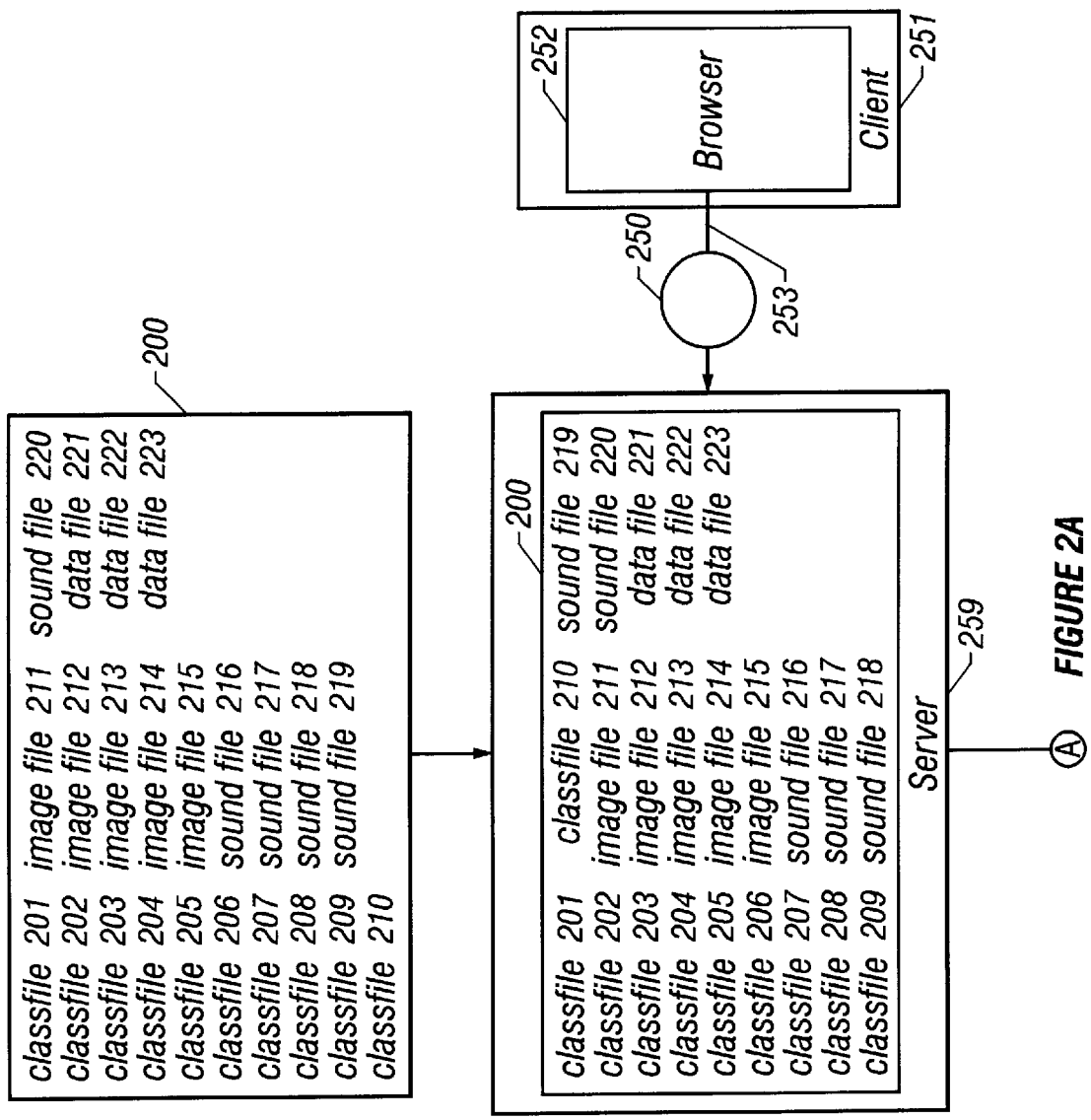
FIG. 2 illustrates distributing a computer program comprised of multiple files across a computer network.
Figure 2B:
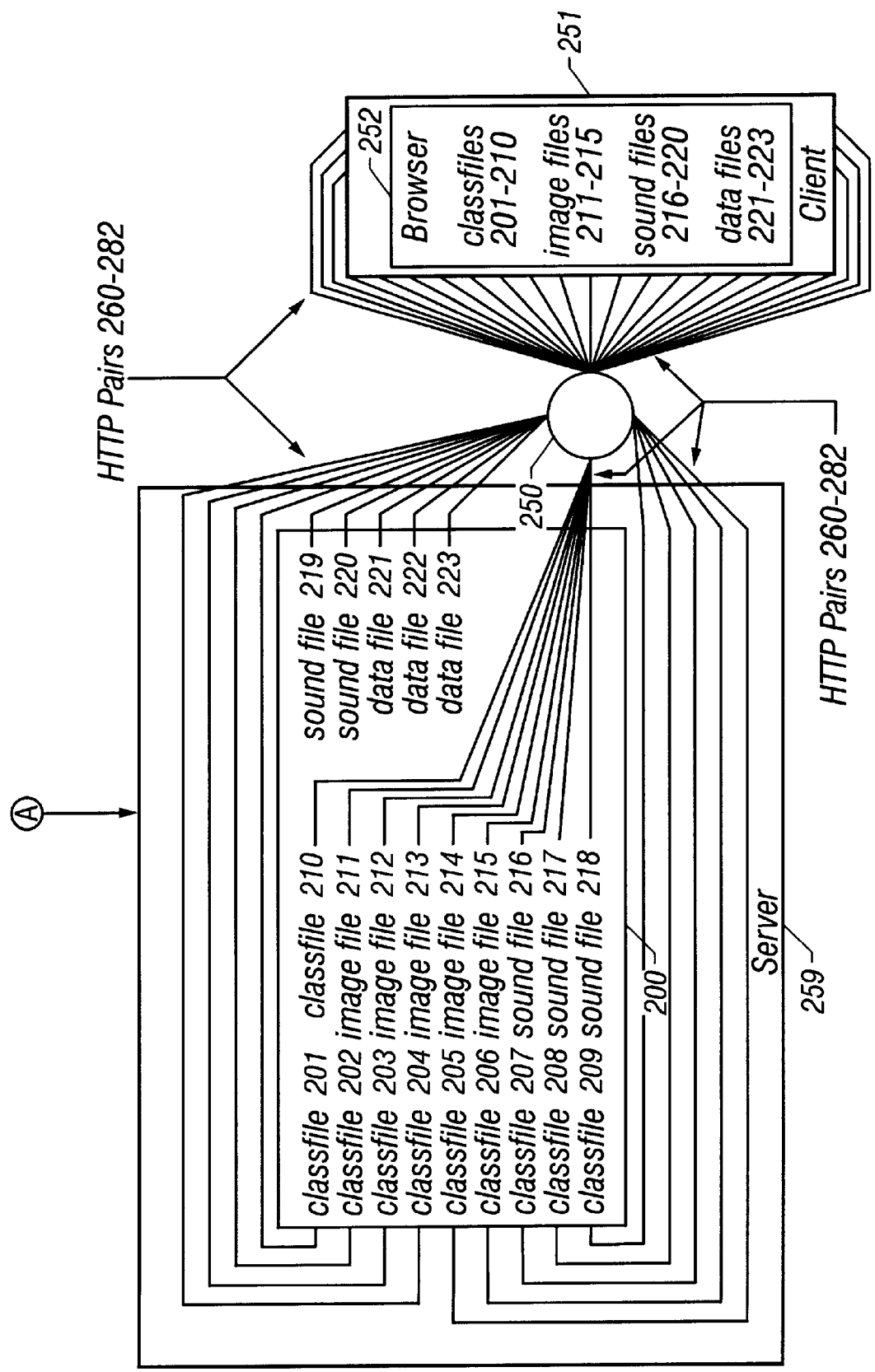
Figure 3:
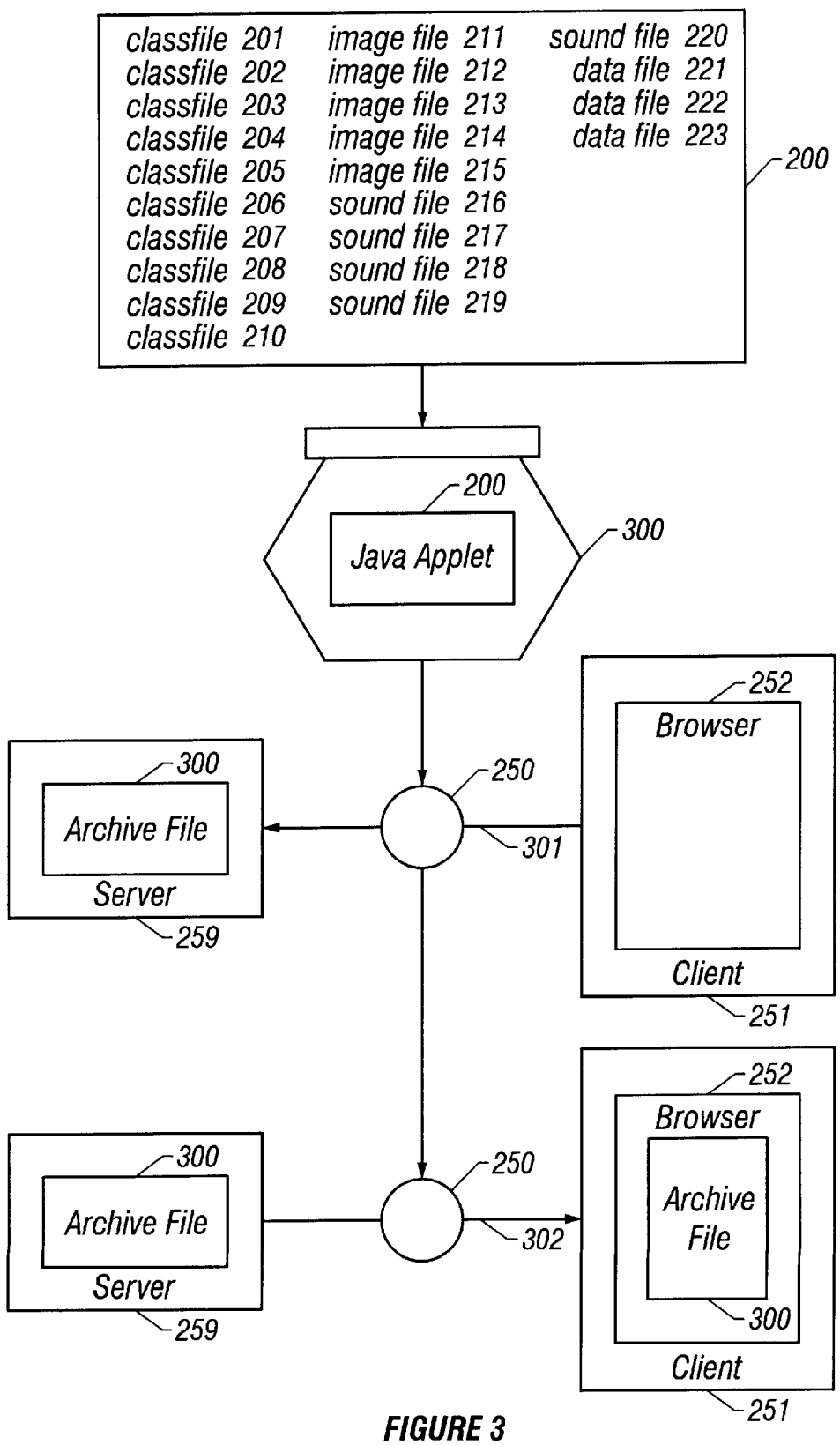
FIG. 3 illustrates distributing a computer program comprised of multiple files across a computer network using an archive file.

A method and apparatus for automatically optimizing execution of a computer program is described. In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

One embodiment of the invention is implemented using object-oriented programming techniques. To understand the current approaches to distributing computer programs over a network using object-oriented programming languages, a review of object-oriented programming is helpful.

Object-Oriented Programming

Object-oriented programming is a method of creating computer programs by combining certain fundamental building blocks, and creating relationships among and between the building blocks. The building blocks in object-oriented programming systems are called "objects." An object is a programming unit that groups together a data structure (one or more instance variables) and the operations (methods) that can use or affect that data. Thus, an object consists of data and one or more operations or procedures that can be performed on that data. The joining of data and operations into a unitary building block is called "encapsulation."

An object can be instructed to perform one of its methods when it receives a "message." A message is a command or instruction sent to the object to execute a certain method. A message consists of a method selection (e.g., method name) and a plurality of arguments. A message tells the receiving object what operations to perform.

One advantage of object-oriented programming is the way in which methods are invoked. When a message is sent to an object, it is not necessary for the message to instruct the object how to perform a certain method. It is only necessary to request that the object execute the method. This greatly simplifies program development.

Object-oriented programming languages are predominantly based on a "class" scheme. The class-based object-oriented programming scheme is generally described in Lieberman, "Using Prototypical Objects to Implement Shared Behavior in Object-Oriented Systems," OOPSLA 86 Proceedings, September 1986, pp. 214–223.

A class defines a type of object that typically includes both variables and methods for the class. An object class is used to create a particular instance of an object. An instance of an object class includes the variables and methods defined for the class. Multiple instances of the same class can be created from an object class. Each instance that is created from the object class is said to be of the same type or class.

To illustrate, an employee object class can include "name" and "salary" instance variables and a "set_salary" method. Instances of the employee object class can be created, or instantiated for each employee in an organization. Each object instance is said to be of type "employee." Each employee object instance includes "name" and "salary" instance variables and the "set_salary" method. The values associated with the "name" and "salary" variables in each employee object instance contain the name and salary of an employee in the organization. A message can be sent to an employee's employee object instance to invoke the "set_salary" method to modify the employee's salary (i.e., the value associated with the "salary" variable in the employee's employee object).

A hierarchy of classes can be defined such that an object class definition has one or more subclasses. A subclass inherits its parent's (and grandparent's etc.) definition. Each subclass in the hierarchy may add to or modify the behavior specified by its parent class. Some object-oriented programming languages support multiple inheritance where a subclass may inherit a class definition from more than one parent class. Other programming languages support only single inheritance, where a subclass is limited to inheriting the class definition of only one parent class. The Java programming language also provides a mechanism known as an "interface" which comprises a set of constant and abstract method declarations. An object class can implement the abstract methods defined in an interface. Both single and multiple inheritance are available via interfaces. That is, a class can inherit an interface definition from more than one parent interface.

An object is a generic term that is used in the object-oriented programming environment to refer to a module that contains related code and variables. A software application can be written using an object-oriented programming language whereby the functionality of the program is implemented using objects.

Optimally Executing a Computer Program

Embodiments of the invention can be used to automatically determine the files needed to optimally execute a computer program until a desired state is reached. In one embodiment, the invention automatically creates an optimized file containing the files that are necessary for the computer program to reach the desired state. Creating an optimized file is useful, for example, when a computer program is transported across a network to another computer where it is then executed.

In one embodiment of the invention, the files needed to execute the computer program to a desired state are sent across the network to a client computer in the optimized file. The desired state may be, for example, the point at which the computer program is capable of receiving user input. Once the files contained in the optimized file are received, the client computer can execute the program to the desired state without waiting for the remaining files used during the execution of the program to be transmitted across the network. Since the program can begin execution before all the files that comprise the computer program are received, the amount of time required to start the program is reduced.

In one embodiment of the invention, the optimized file is a collection of data files packaged together into a single file. A file that uses the Java Archive (AR) format, for example, can be used to create an optimized file. Alternatively, other types of file packaging formats such as the ZIP file format can also be used to implement one or more embodiments of the invention. It should be apparent to one skilled in the art that any type of file or file format that supports the inclusion of one or more other files is suitable for creating an optimized file. Computer programs are typically comprised of more than one file. A computer program implemented as a Java applet, for example, is comprised of classfiles, image files, and other data files. However, only a percentage of the files that comprise a computer program are required to begin executing the program.

In an embodiment of the invention, the files needed to start the program are automatically determined and placed into an optimized file. To create an optimized file the files that comprise a computer program are identified. These files are then analyzed and the ones needed to bring the program to a desired state are placed into the optimized file. In one embodiment of the invention, this process is carried out by an optimization engine, which determines what portion of files the program needs to execute, and an optimizor which creates the optimized file. The optimization engine creates a list of the files that enable the computer program to begin executing. This list of files is stored in an intermediate file and passed to the optimizor.

The optimizor uses the list to create an optimized file. The optimized file typically contains the portion of files that the computer program requires to load. For example, the optimized file may contain the files needed by the computer program to reach a state where user input can be accepted by the computer program. However, the optimized file may contain files used by the program at any state. A desired state, for example, may occur prior to when the computer program accesses a large data file or prior to when the program engages in a time consuming calculation. It should be apparent to one skilled in the art that the files placed into the optimized file or any other type of file can be any of the files used by the program during execution. Further, the desired state of the computer program can be defined to be any point during the execution of the computer program.

Figure 4:
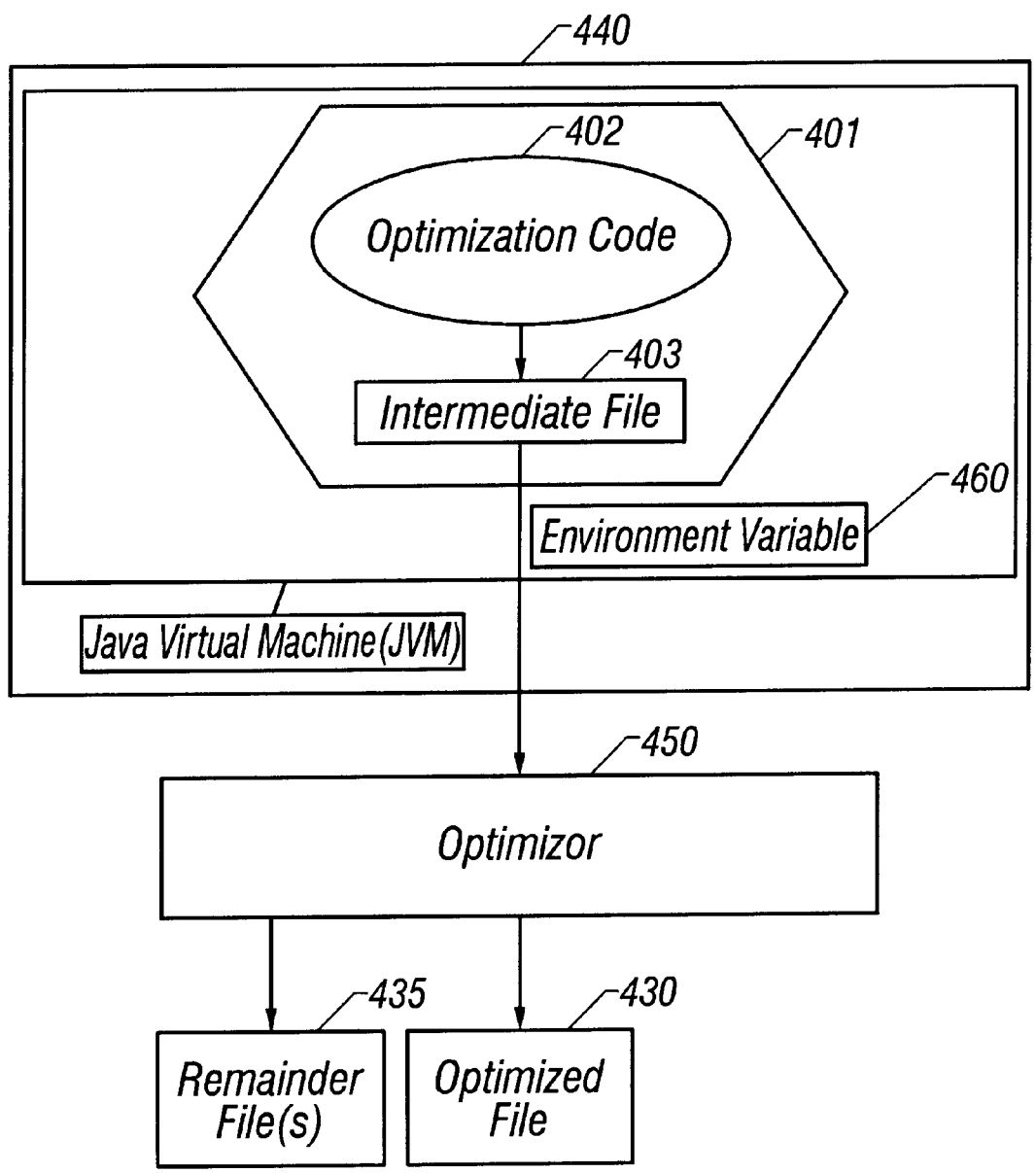
FIG. 4 illustrates an embodiment of the invention that utilizes an optimization engine to generate information and pass it to an optimizor.

FIG. 4 illustrates an embodiment of the invention that utilizes an optimization engine 401 to determine how to optimally execute a computer program. The optimization engine 401 accomplishes this by analyzing the program until it reaches a desired state, generating information about that state, and passing that information to an optimizor 450. In this embodiment of the invention the desired state may be determined by the optimization engine 401, the user, or the software developer. To determine the optimal way to execute a computer program the optimization engine 401 separates the files that makeup the program into different categories. For example, the portion of files used to load the program are placed into one category and (if the optimization engine is aware of them) the remaining portion of files are placed into another category.

The invention contemplates a method of operation where the user manually chooses when the desired state has been reached. Alternatively, an API could be provided which the programmer calls to tell the engine when the desired state has been reached.

The optimizor 450 uses the desired state information to build a set of optimized files. In one embodiment of the invention, optimizor 450 builds an optimized file 430 that contains the files needed for the program to reach the desired state. The optimized file contains the files used by the program to reach a desired state. The optimizor 450 can also build one or more optimized remainder files 435. The remainder files 435 may be files that are not necessarily needed by the program to reach the desired state.

The optimization engine 401 decides what files to placed into the first category by generating a list of the files needed to reach a desired state of the computer program. In one embodiment of the invention the optimization engine 401 generates this list by using optimization code 402. Optimization code 402 is program code configured to load and keep track of the files executed by the program. The "class loader" in the JRE, for example, can be modified to produce optimization code 402. The standard class loader can then be replaced by the optimization code 402. When a program is loaded using a standard "class loader" the contents of the files that are loaded to run the application are stored in a hash table. The standard "class loader" checks the hash table before it loads a new file. If the file name is already in the hash table it is not loaded. This prevents loading duplicate versions of the same file.

In one embodiment of the invention, a public method is added to the standard class loader to create optimization code 402. Once the program reaches a desired state (e.g. the program is ready to accept user input) optimization code 402 dumps the contents of the hash table out into a file. This creates a file that contains a list of the files the program needs to reach the desired state. The file may contain, for example, the list of files the program needs to reach a state where the program is ready to accept user input. In one embodiment of the invention, the contents of the hash table are dumped into an intermediate file 403. Thus, intermediate file 403 may contain the classfiles, image files, sound files, data files, etc. needed to start the program. Intermediate file 403 may contain a list of files or the contents of the files.

The optimization engine 401 may employ other alternative methods for obtaining a list of the files used by the program until a desired state. Once intermediate file 403 is created it can be passed to the optimizor 450 for processing. The optimizor 450 then uses intermediate file 403 to create an optimized file 430.

In one embodiment of the invention, optimization engine 401 resides inside the JVM of client computer 440. To locate the optimization code 402, client computer 440 examines an environment variable 460. In one embodiment of the invention, environment variable 460 is a CLASSPATH variable. The CLASSPATH variable indicates the path to the optimization code 402. For example, if the optimization code 402 is located on client computer 440 at C:\jdk1.1.6\lib\classes.zip then the CLASSPATH variable contains the information to enable client computer 440 to locate the optimization code 402. (Alternatively, the -classpath command-line option can be used). Once optimization code 402 is found, the program is processed using optimization code 402. The optimization code 402 then generates intermediate file 403 which is passed to the optimizor 450 for processing.

Figure 5:
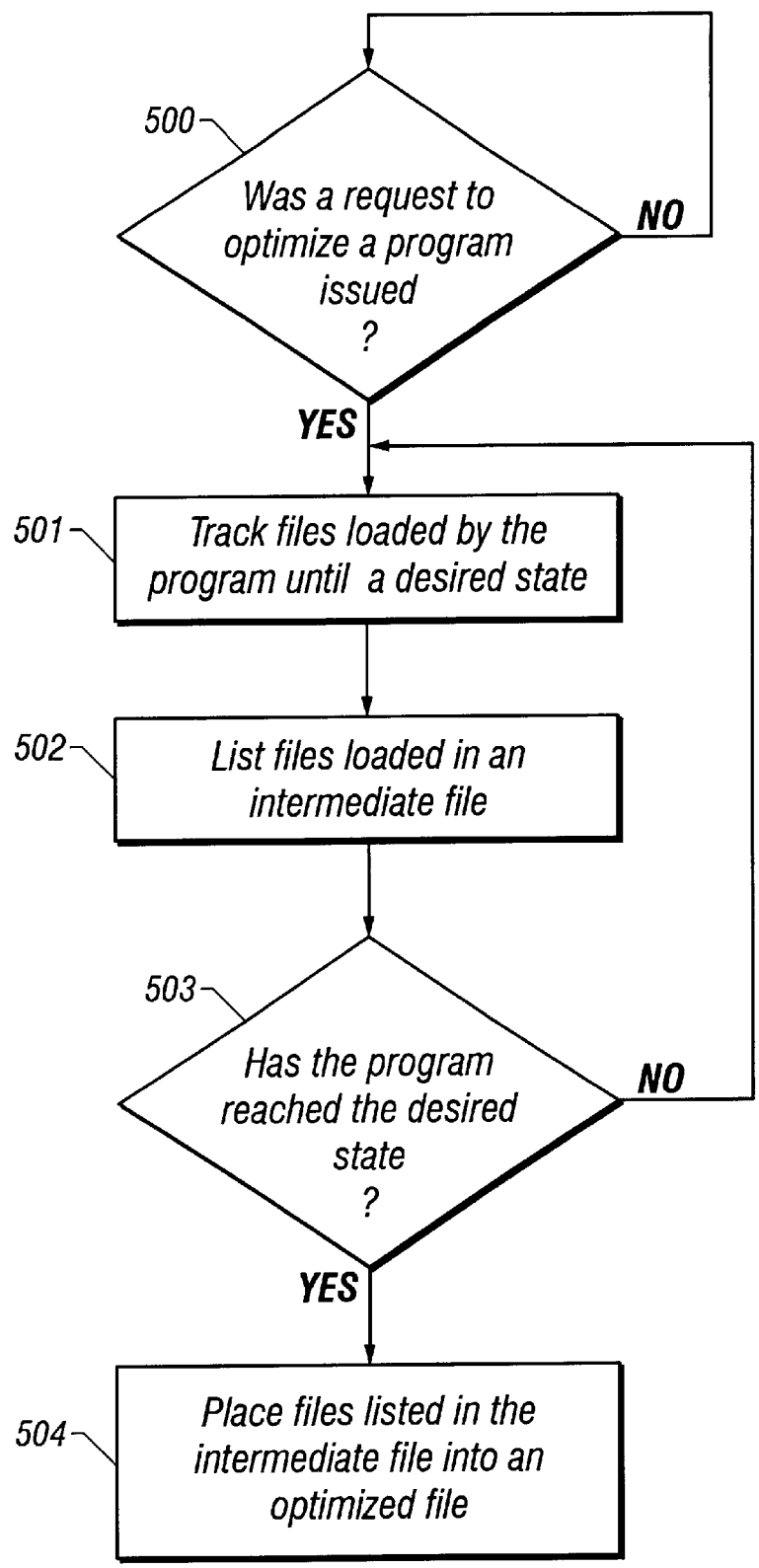
FIG. 5 illustrates a process used in one embodiment of the invention to optimize execution of a program.

The process used in one embodiment of the invention to optimize execution of a computer program is illustrated in FIG. 5. In this process the files that are used to reach a desired computer program state are selected and placed into optimized file 430. The method begins at step 500 when the user issues a request to optimize a program. Once this occurs, step 501 tracks what files the program loads during execution. In one embodiment of the invention, the program is run through an optimization engine 401 that resides on client 440. In step 502, a list of the files that the program loads are placed in an intermediate file. In one embodiment of the invention, optimization engine 401 places the files used by the program to initially load into intermediate file 403.

In step 503, a determination is made as to whether or not program execution has reached a desired state. This determination can be made by the user (or, in another embodiment, calling an API to tell the engine when the desired state has been reached). An example of a desired state is the point at which the program is ready to receive user input. Typically a program reaches this state after the user issues a command to open the program and before the user provides the program with any input. If it is determined that the program is in the desired state, then step 504 is executed and the entries found in the intermediate file are placed into an optimized file. The entries generated by the optimization engine 401 and placed in the intermediate file may also be placed directly into the optimized file without the use of the intermediate file.

In one embodiment of the invention, an optimizor 450 executes step 504. The optimizing engine 401 and the optimizor 450 can reside on separate computers that are capable of communicating with one another. In another embodiment of the invention, the optimization engine 401 and the optimizor 450 reside in the same computer.

Figure 6A:
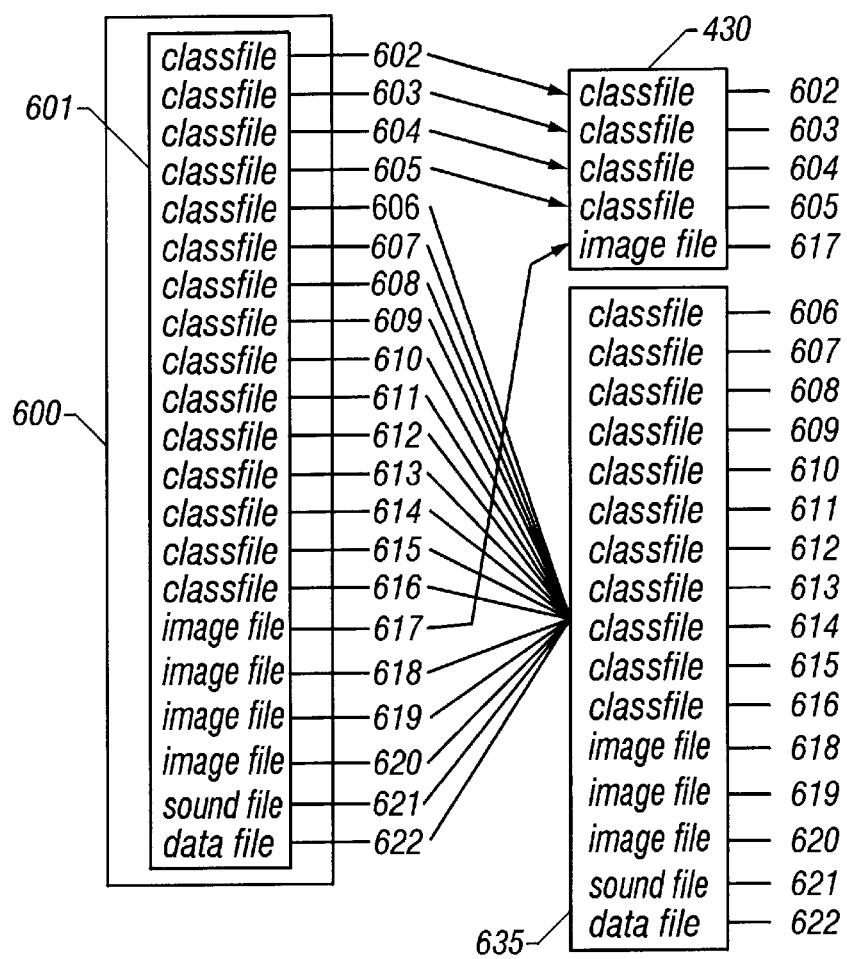
FIG. 6A illustrates one embodiment of the invention wherein an optimized file and remainder files are obtained.

FIG. 6A illustrates one embodiment of the invention wherein an optimized file and a remainder file are obtained. A list 601 of the files that comprise a computer program 600 is shown. List 601 contains a sound file 621, a data file 622, classfiles 602–616 and image files 617–620. Classfiles 602, 603, 604, 605 and image file 617 are needed to reach the desired program state and are placed into optimized file 430. The remainder file(s) 635 is comprised of the files in list 601 not included in optimized file 430.

In one embodiment of the invention, more than one remainder file(s) 635 is created. Categories may be created for different types of files. Each remainder file 635 may use different compression techniques and contain different types of files. Both optimized file 430 and remainder file 635 are placed on server 640 where they reside until requested by client 650.

Figure 6B:
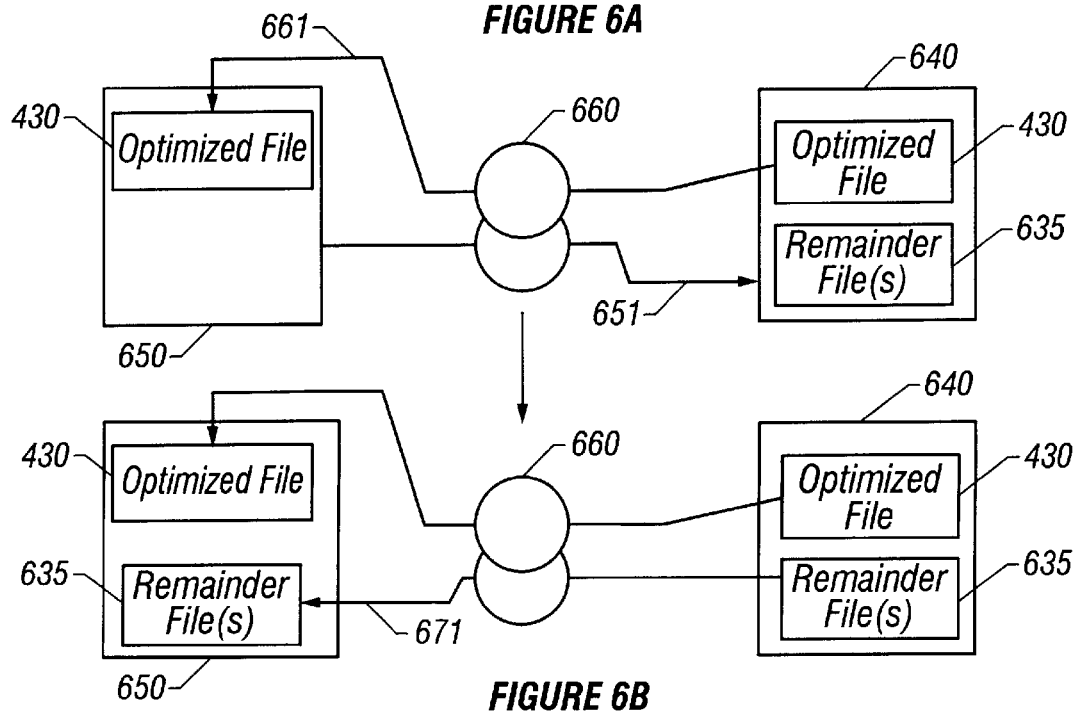
FIG. 6B illustrates the transfer of an optimized file and a remainder file to a client computer via a network according to an embodiment of the invention.

FIG. 6B illustrates the transfer of optimized file 430 to a client computer via a network according to an embodiment of the invention. In this embodiment, client 650 is the computer upon which program 600 is executed. To begin executing program 600, client 650 issues a request 651. The request 651 is delivered to the network 660 and sent to server 640 for processing. Network 660 is a network configured to allow multiple computers to communicate with each other. In one embodiment of the invention, network 660 is the Internet and utilizes the Transmission Control Protocol/Internet Protocol (TCP/IP) to communicate. Network 660 can also utilize other protocols such as IPX or Apple Talk.

In one embodiment of the invention, server 640 delivers optimized file 430 to client 650 across network 660 using a single HTTP response 661. Optimized file 430 is sent to client 650 before other portions of program 600 (e.g. remainder file(s) 635). The remainder file(s) 635, for example, are sent to client 650 after optimized file 430 is sent. In one embodiment of the invention, all the files not in optimized file 430 are placed into a single reminder file 635 and sent across network 660 in a single HTTP request/response pair 671. In another embodiment, multiple remainder files 635 are sent across network 660 to client 650 using multiple HTTP request/response pairs.

Figure 7:
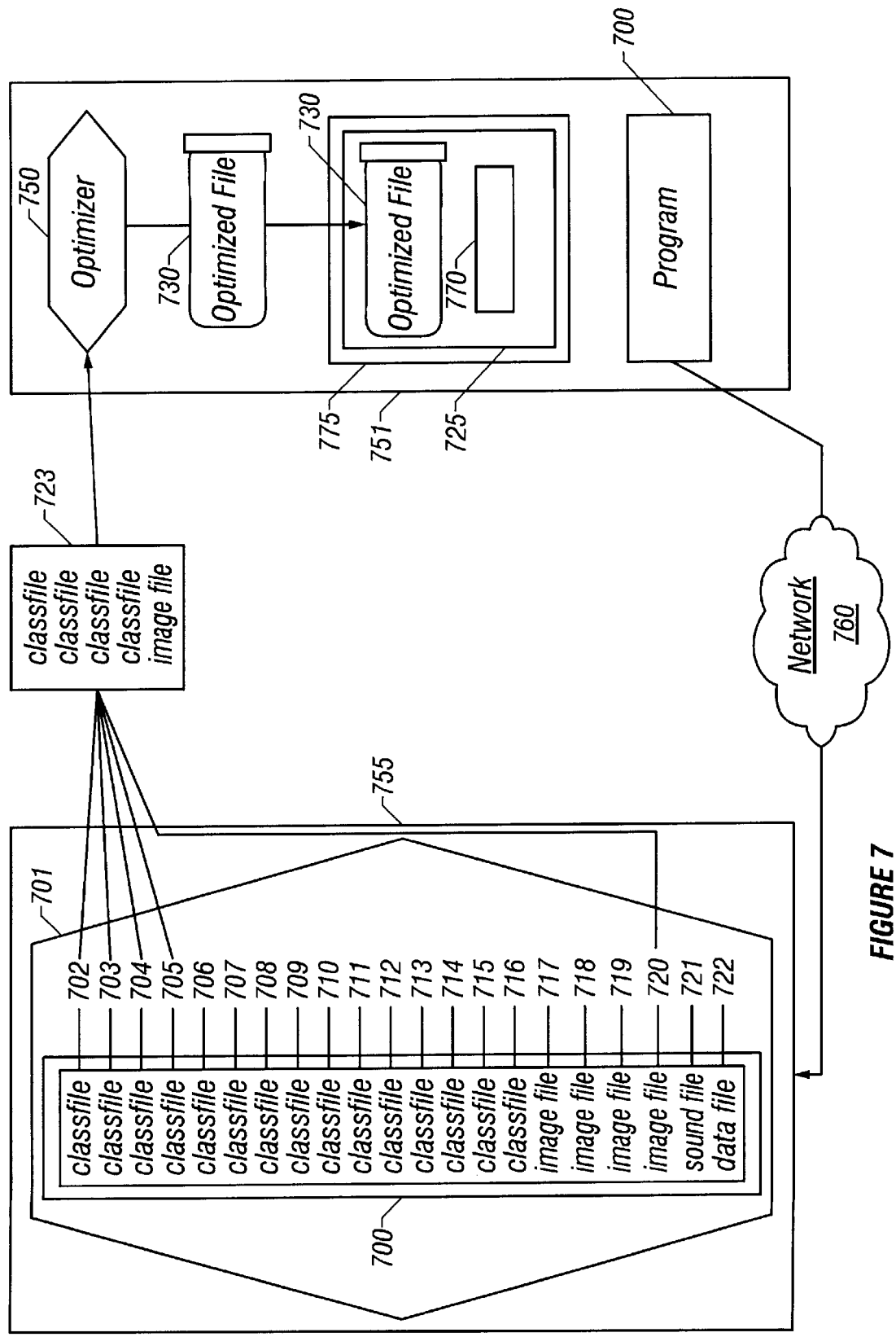
FIG. 7 illustrates an embodiment of the invention that identifies the files to be placed in an optimized file.

FIG. 7 shows an embodiment of the present invention to identify the files to be placed in optimized file 730. If program 700 initially resides on server 751, for example, an optimized file 730 is created by passing program 700 to client 755 through network 760. Client 755 analyzes program 700 using an optimization engine 701. The optimization engine 701 determines what files are loaded by program 700 until a desired state is reached (e.g. the program is ready to accept user input). Once the optimization engine 701 determines what files are executed prior to reaching the desired state, it creates an intermediate file 723. The intermediate file 723, for example, is comprised of a list of the files needed to reach the desired state of program 700. If program 700, for example, is comprised of the following files: classfiles 702–716, image files 717–720, sound file 721, and data file 722, and if only classfiles 702–705 and image file 720 are needed to bring program 700 to the desired state, intermediate file 723 is comprised of classfiles 702–705 and image file 720.

In one embodiment of the invention, intermediate file 723 does not contain any of the other files (e.g. classfiles 706–716, image files 717–719, sound file 721, and data file 722) executed by program 700. Once intermediate file 723 is generated, it is passed to an optimizor 750 that resides on server 751. The optimizor 750 generates a single file that contains all the files in intermediate file 723. The file built by optimizor 750 is called an optimized file 730. Optimized file 730, for example, may be in the form of a Java archive (JAR) file or a ZIP file. Once optimized file 730 is created, an optimized version of program 700, called the optimized program 725, is stored on server 751 in data store 775. The optimized program 725 comprises an optimized file 730 and one or more additional files 770 (e.g. remainder files 635). When a client computer issues a request to server 751 for the optimized program 725 the optimized file 730 is sent first through the network 760. Additional files 770 may be subsequently sent to the client computer during or after execution of the optimized file 730.

Figure 8:
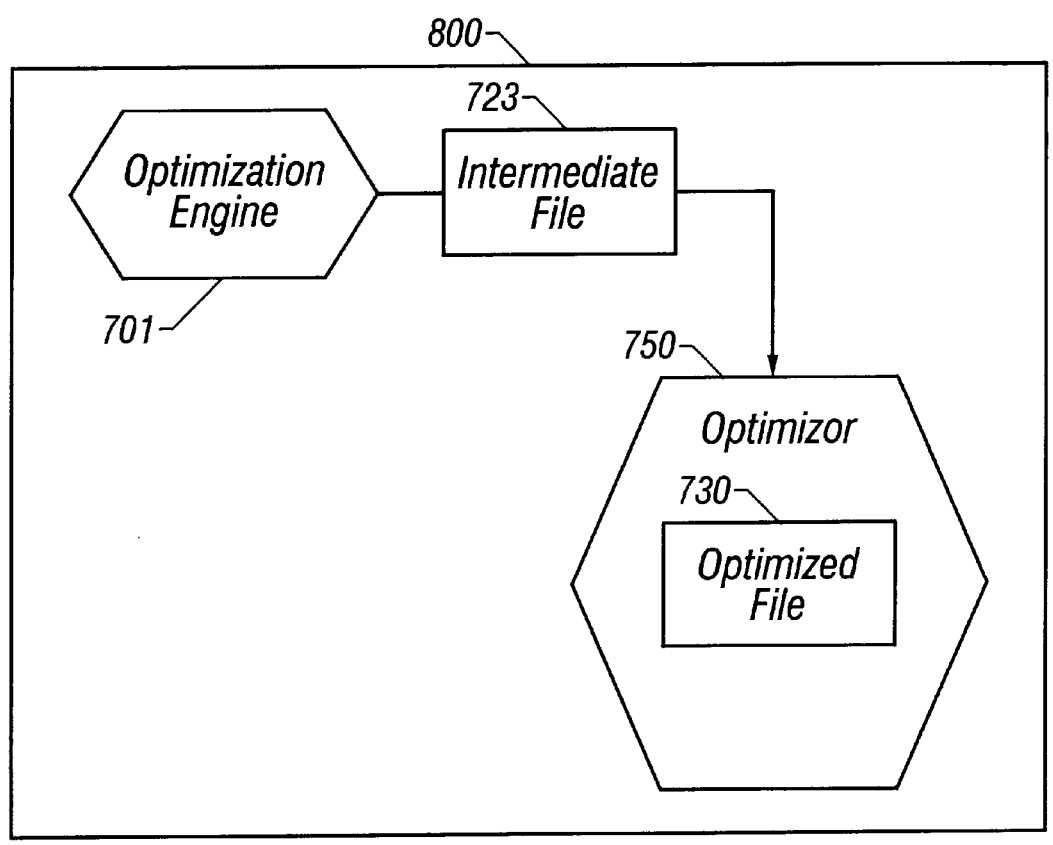
FIG. 8 illustrates an embodiment of the invention where the optimizor and the optimization engine reside on the same computer.

In one embodiment of the invention, optimization engine 701 and optimizor 750 reside on a client computer 800 as illustrated in FIG. 8. In this embodiment, optimization engine 701 generates intermediate file 723 and delivers it to optimizor 750. Optimizor 750 then creates optimized file 730.

In one embodiment of the invention, optimization code 402 captures a list of files (e.g. stored in a hash table) loaded by the computer program as it executes to a desired state. In an alternative embodiment of the invention, the optimization engine 701 captures the list of files contained in Intermediate file 723 from the "hprof" output generated by the -xhprof option. Another possible way is to use the debugging API (JVMDI).

Figure 9:
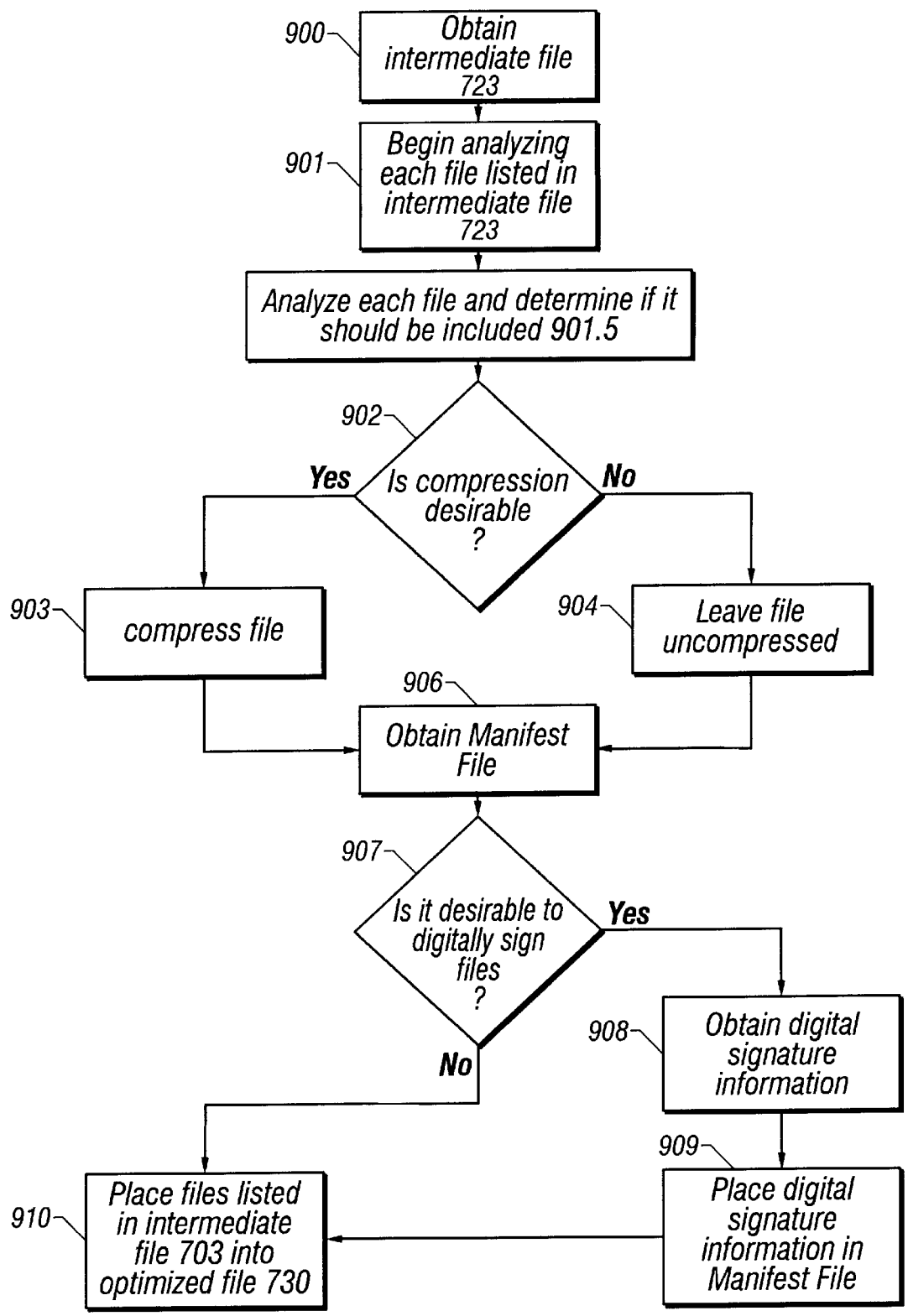
FIG. 9 illustrates an example of the process used by the optimizor to create an optimized file according to one or more embodiments of the invention.

FIG. 9 illustrates an example of the process used by the optimizor 750 to create an optimized file 730 according to one or more embodiments of the invention. At step 900, optimizor 750 accepts as input the list of files that comprise optimized file 730. In an embodiment of the invention, the optimizor 750 obtains the intermediate file 723 from the optimization engine 701. Once the intermediate file 723 is received by the optimizor 750, the optimizor 750 executes step 901 and begins to analyze each file listed in intermediate file 723. At step 901.5, files are analyzed to determine whether the classfile should be included based on the classpath it is from. For example, JDK classes are not necessary in the optimized file and may be excluded. At step 902, optimizor 750 determines whether or not it is desirable to compress each file that is listed in intermediate file 723.

If compression is not desirable then optimizor 750 proceeds to step 904 and the file is left uncompressed. If compression is desirable, then optimizor 750 proceeds to step 903 and the file is compressed. For example, if optimizor 750 encounters an image file that utilizes the Joint Photographic Experts Group (JPEG) format it may elect not to compress the image further. Thus, no compressed JPEG file becomes larger than an uncompressed JPEG file. If the optimizor 750 encounters a text file it may decide that further compression is beneficial.

At step 906, optimizor 750 obtains a manifest file. In one embodiment of the invention, the manifest file is placed in a directory called META-INF. The manifest file may also include other arbitrary information. At step 907, the optimizor 750 determines whether it is desirable to digitally sign the files listed in intermediate file 723. If the optimizor determines to digitally sign a file, step 908 is executed and information about the digital signature is placed into the directory named META-INF.

In one embodiment of the invention, step 909 is also executed and the digital signature information is placed in the manifest file. Otherwise, the optimizor 750 proceeds to step 910 where all the files listed in intermediate file 723 are combined into a single file called the optimized file 730. Once these steps are complete the optimizor 750 outputs the optimized file 730 to a storage medium.

Embodiment of Computer Execution Environment

Figure 10:
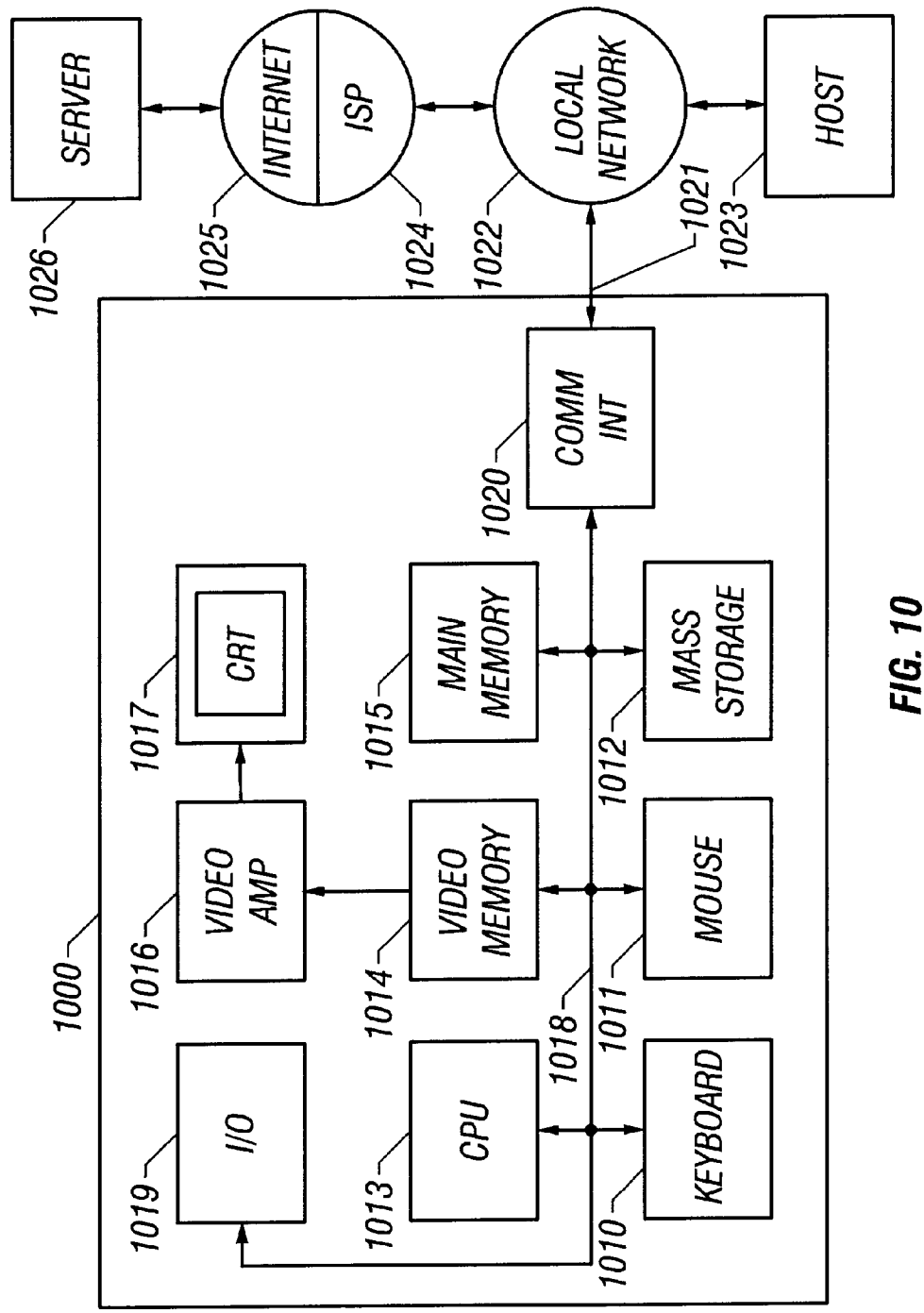
FIG. 10 illustrates an embodiment of the invention implemented in the form of computer readable program code.

An embodiment of the invention can be implemented as computer software in the form of computer readable program code executed on a general purpose computer such as computer 1000 illustrated in FIG. 10. A keyboard 1010 and mouse 1011 are coupled to a bidirectional system bus 1018. The keyboard and mouse are for introducing user input to the computer system and communicating that user input to processor 1013. Other suitable input devices may be used in addition to, or in place of, the mouse 1011 and keyboard 1010. I/O (input/output) unit 1019 coupled to bidirectional system bus 1018 represents such I/O elements as a printer, A/V (audio/video) I/O, etc.

Computer 1000 includes a video memory 1014, main memory 1015 and mass storage 1012, all coupled to bidirectional system bus 1018 along with keyboard 1010, mouse 1011 and processor 1013. The mass storage 1012 may include both fixed and removable media, such as magnetic, optical or magnetic optical storage systems or any other available mass storage technology. Bus 1018 may contain, for example, thirty-two address lines for addressing video memory 1014 or main memory 1015. The system bus 1018 also includes, for example, a 32-bit data bus for transferring data between and among the components, such as processor 1013, main memory 1015, video memory 1014 and mass storage 1012. Alternatively, multiplex data/address lines may be used instead of separate data and address lines.

In one embodiment of the invention, the processor 1013 is a microprocessor manufactured by Motorola, such as the 680×0 processor or a microprocessor manufactured by Intel, such as the 80×86, or Pentium processor, or a SPARC™ microprocessor from Sun Microsystems™. However, any other suitable microprocessor or microcomputer may be utilized. Main memory 1015 is comprised of dynamic random access memory (DRAM). Video memory 1014 is a dual-ported video random access memory. One port of the video memory 1014 is coupled to video amplifier 1016. The video amplifier 1016 is used to drive the cathode ray tube (CRT) raster monitor 1017. Video amplifier 1016 is well known in the art and may be implemented by any suitable apparatus. This circuitry converts pixel data stored in video memory 1014 to a raster signal suitable for use by monitor 1017. Monitor 1017 is a type of monitor suitable for displaying graphic images.

Computer 1000 may also include a communication interface 1020 coupled to bus 1018. Communication interface 1020 provides a two-way data communication coupling via a network link 1021 to a local network 1022. For example, if communication interface 1020 is an integrated services digital network (ISDN) card or a modem, communication interface 1020 provides a data communication connection to the corresponding type of telephone line, which comprises part of network link 1021. If communication interface 1020 is a local area network (LAN) card, communication interface 1020 provides a data communication connection via network link 1021 to a compatible LAN. Wireless links are also possible. In any such implementation, communication interface 1020 sends and receives electrical, electromagnetic or optical signals which carry digital data streams representing various types of information.

Network link 1021 typically provides data communication through one or more networks to other data devices. For example, network link 1021 may provide a connection through local network 1022 to host computer 1023 or to data equipment operated by an Internet Service Provider (ISP) 1024. ISP 1024 in turn provides data communication services through the world wide packet data communication network now commonly referred to as the "Internet" 1025. Local network 1022 and Internet 1025 both use electrical, electromagnetic or optical signals which carry digital data streams. The signals through the various networks and the signals on network link 1021 and through communication interface 1020, which carry the digital data to and from computer 1000, are exemplary forms of carrier waves transporting the information.

Computer 1000 can send messages and receive data, including program code, through the network(s), network link 1021, and communication interface 1020. In the Internet example, server 1026 might transmit a requested code for an application program through Internet 1025, ISP 1024, local network 1022 and communication interface 1020. In accord with the invention, one such downloaded application is the method and apparatus for optimizing execution of a computer program described herein.

The received code may be executed by processor 1013 as it is received, and/or stored in mass storage 1012, or other non-volatile storage for later execution. In this manner, computer 1000 may obtain application code by way of a carrier wave.

Application code may be embodied in any form of computer program product. A computer program product comprises a medium configured to store or transport computer readable code, or in which computer readable code may be embedded. Some examples of computer program products are CD-ROM disks, ROM cards, floppy disks, magnetic tapes, computer hard drives, servers on a network, and carrier waves.

The computer system described above is for purposes of example only. An embodiment of the invention may be implemented in any type of computer system or programming or processing environment including, but not limited to, an embedded system.

Thus, a method and apparatus for method and apparatus for optimizing execution of a computer program has been provided in conjunction with one or more specific embodiments. The invention is defined by the claims and their full scope of equivalents.

What is claimed is:

1. A method for automatically optimizing execution of a computer program comprising:
   identifying a computer program having a plurality of files;
   identifying a first portion of said plurality of files used to attain a desired state, wherein said desired state comprises the point of execution at which said computer program can accept user input;
   placing said first portion into an optimized file.
2. The method of claim 1 further comprising the steps of:
   obtaining a second portion of said plurality of files;
   placing said second portion into a remainder file.
3. The method of claim 2 wherein said remainder file is comprised of files used by said computer program after said desired state.
4. The method of claim 2 wherein said remainder file is comprised of more than one file, said files used by said computer program after said desired state are placed in zero or more of said remainder files.
5. The method of claim 2 further including the steps of:
   storing said remainder file on a first computer;
   sending said remainder file from said first computer to a second computer after said optimized file is sent from said first computer to said second computer.
6. The method of claim 2 further comprising:
   sending said remainder file when one of said files is needed by said computer program.
7. The method of claim 2 wherein at least one of said plurality of files in said remainder file is compressed.
8. The method of claim 1 further comprising:
   storing said optimized file on a first computer;
   sending said optimized file from said first computer to a second computer;
   using said optimized file to initiate said computer program on said second computer.
9. The method of claim 1 wherein at least one of said plurality of files in said optimized file is compressed.
10. An apparatus comprising:
    a processor;
    a memory coupled to said processor;
    a computer program having a plurality of files stored in said memory;
    a process executed on said processor, said process configured to identify a first portion of said plurality of files used to attain a desired state, wherein said desired state is when said computer program is ready to receive user input.
11. The apparatus of claim 10 wherein said process is further configured to obtain a second portion of said plurality of files and place said second portion into a remainder file.
12. The apparatus of claim 11 wherein said remainder file is comprised of files used by said computer program after said desired state.
13. The apparatus of claim 11 wherein said remainder file is stored on said first computer and sent from said first computer to a second computer after said optimized file is sent from said first computer to said second computer.
14. The apparatus of claim 10 wherein said first portion is placed into an optimized file.
15. The apparatus of claim 10 further comprising:
    a virtual machine having a class loader and a runtime data area, said class loader configured to obtain said first portion.
16. The apparatus of claim 10 wherein said process is configured to store said optimized file on a first computer and send said optimized file from said first computer to a second computer.
17. The apparatus of claim 10 wherein said optimized file is executed on said second computer.
18. A computer program product comprising:
    a computer usable medium having computer readable code embodied therein for automatically optimizing execution of a computer program, said computer program product comprising:
    computer readable code configured to cause a computer to identify a computer program having a plurality of files;
    computer readable code configured to cause a computer to identify a first portion of said plurality of files used to attain a desired state wherein said desired state comprises the point of execution at which said computer program can accept user input.
19. The computer program product of claim 18 further comprising computer readable code configured to place said first portion into an optimized file.

20. The computer program product of claim 18 further comprising computer readable code configured to cause a computer to:
   store said optimized file on a first computer;
   send said optimized file from said first computer to a second computer;
   use said optimized file to initiate said computer program on said second computer.

21. The computer program product of claim 18 further comprising computer readable code configured to cause a computer to:
   obtain a second portion of said plurality of files;
   place said second portion into a remainder file.

22. The computer program product of claim 18 wherein said remainder file is comprised of files used by said computer program after said desired state.

23. The computer program product of claim 18 further including computer readable code configured to:
   store said remainder file on a first computer;
   send said remainder file from said first computer to a second computer after said optimized file is sent from said first computer to said second computer.

24. The computer program product of claim 18 further comprising computer readable code configured to use said remainder file as needed by said computer program.

* * * * *